Figure 1:
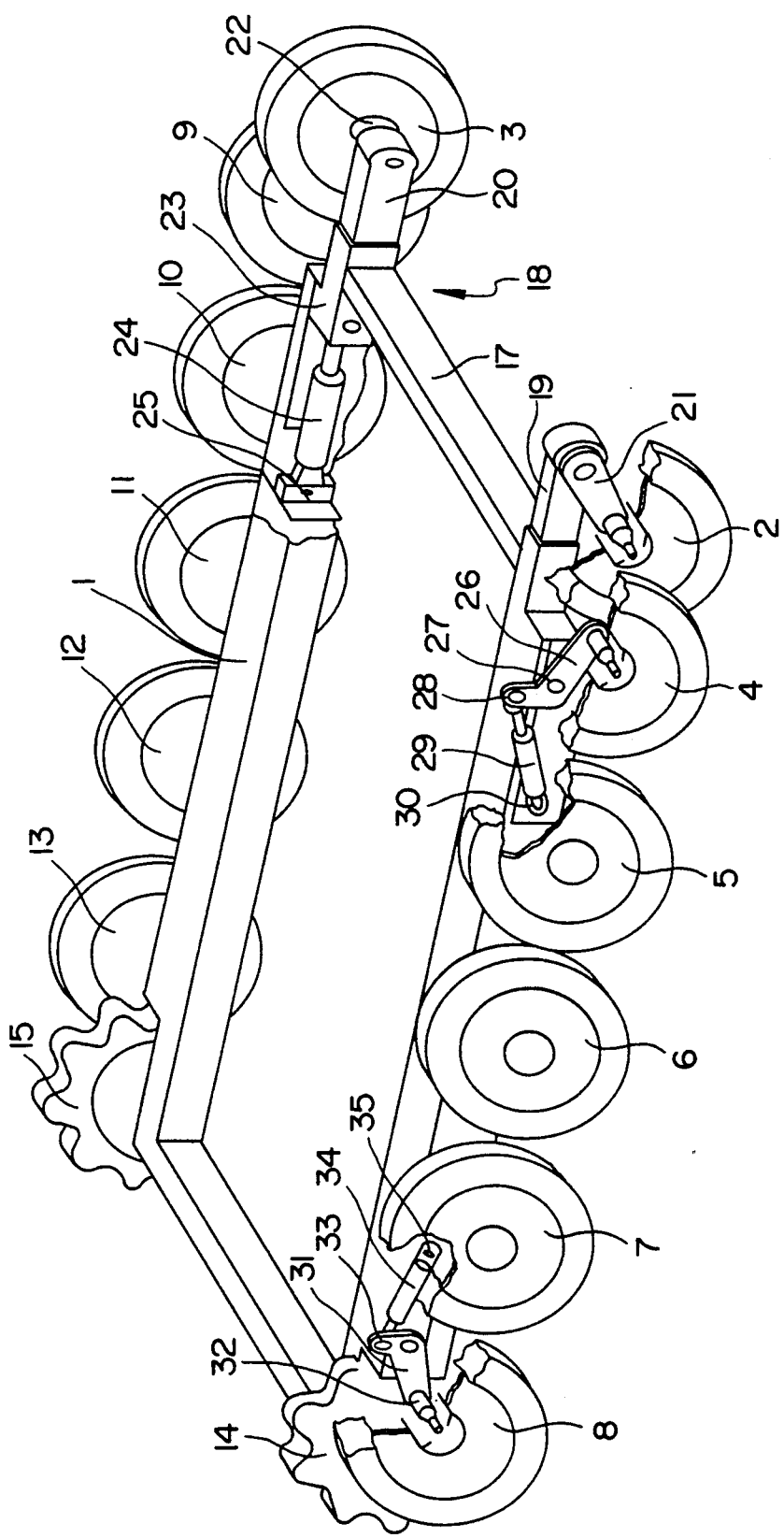

United States Patent [19]
Platter et al.

[11] Patent Number: 5,062,493.
[45] Date of Patent: Nov. 5, 1991

[54] TRACKED VEHICLE AND IN PARTICULAR ONE FOR THE PREPARATION OF SKI SLOPES

[75] Inventors: Helmuth Platter, Vipiteno; Artur Webhofer, Chiusa, both of Italy

[73] Assignee: Leitner, S.p.A., Italy

[21] Appl. No.: 555,050

[22] Filed: Jul. 19, 1990

[51] Int. Cl.⁵ .............................................. B62D 55/30
[52] U.S. Cl. .................... 180/9.52; 180/9.54; 37/224
[58] Field of Search ................ 37/223, 224; 180/9.54, 180/9.52, 9.1; 305/10, 21, 24, 27, 29-32

[56] References Cited

U.S. PATENT DOCUMENTS

| | | | |
|---|---|---|---|
| 3,386,778 | 6/1968 | Rymes | 305/27 |
| 3,692,132 | 9/1972 | Pollanen | 305/27 X |
| 4,087,135 | 5/1978 | Unruh | 305/30 X |
| 4,458,954 | 7/1984 | Haas | 305/32 X |
| 4,458,955 | 7/1984 | Webb | 305/27 X |
| 4,500,139 | 2/1985 | Tucek | 305/27 X |
| 4,516,649 | 5/1985 | Braathen | 305/29 X |

Primary Examiner—Randolph A. Reese
Assistant Examiner—Franco S. De Liguori
Attorney, Agent, or Firm—Shlesinger Fitzsimmons Shlesinger

[57] ABSTRACT

A tracked vehicle is described for travel along a terrain and in particular one for the preparation of ski slopes. The vehicle comprises a self-bearing chassis, a plurality of running bearing wheels fixed in a rotating manner on horizontal axles at each longitudinal side of the chassis, a drive wheel fixed in a rotating manner on a horizontal axle at one of the ends of each longitudinal side of the chassis and, a track tightening wheel fixed to a horizontal axle at the other end of each longitudinal side of the chassis downstream of the last bearing wheel. At least one of the rear bearing wheels is supported by the chassis with its axle movable in the vertical plane containing it, there being provided linkages for moving the wheel from a lowered position, in which part of the track running thereon is in contact with a longer portion of the underlying terrain, to a position wherein part of the track is raised from the terrain.

6 Claims, 2 Drawing Sheets

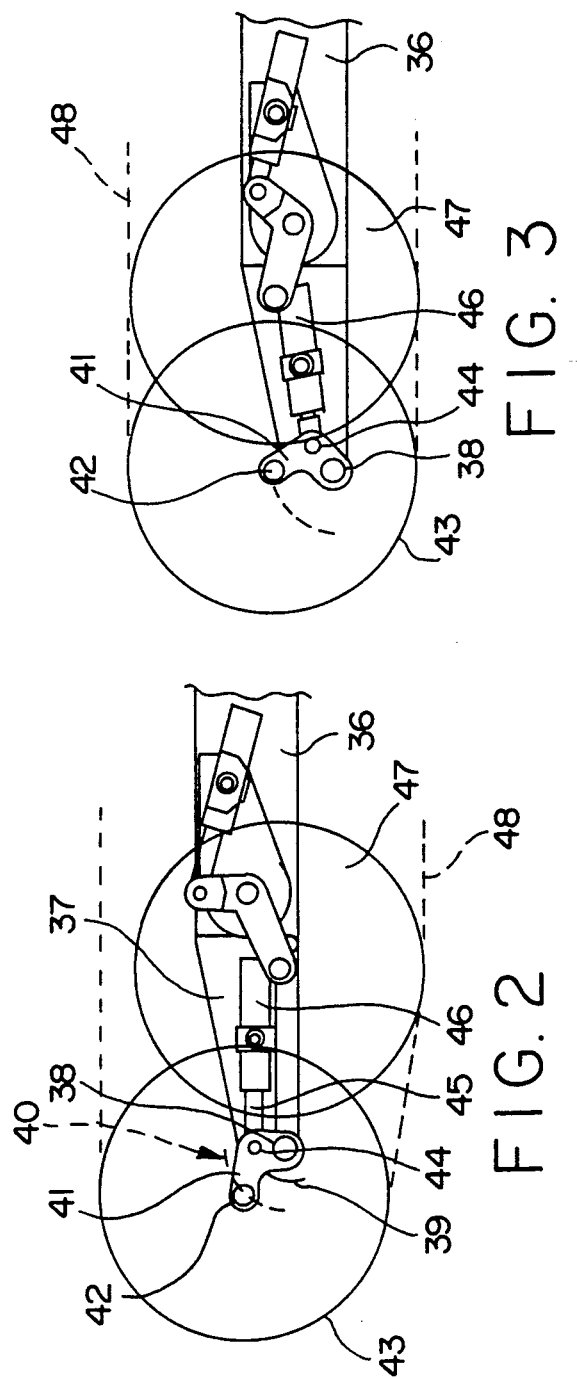
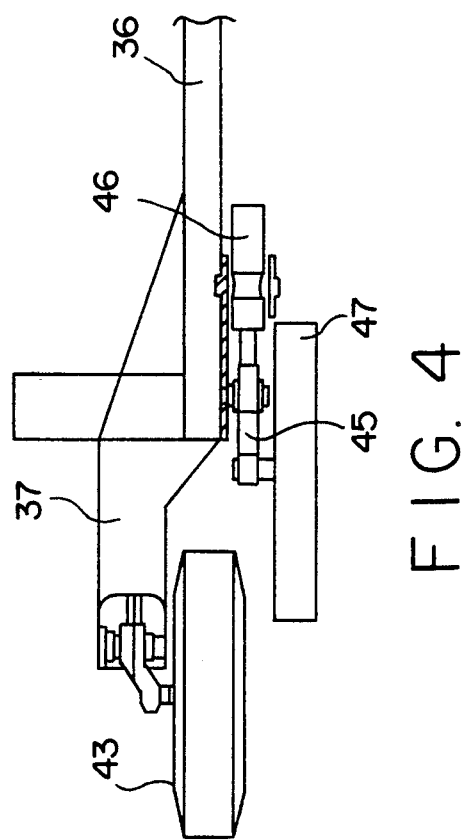

TRACKED VEHICLE AND IN PARTICULAR ONE FOR THE PREPARATION OF SKI SLOPES

The invention relates to a tracked vehicle and in particular one for the preparation of ski slopes.

Tracked vehicles are known wherein on each longitudinal side of a selfbearing chassis there is a track tightening wheel, together with a plurality of running bearing wheels and, at the end, a drive wheel with teeth meshing between strips even in the form of lugs and bearing a closed loop belt or track supported on bearing wheels which turn or rotate in the same vertical plane, i.e. perpendicular to the plane defined by the chassis, with a horizontal axle viewed in the direction of travel of the tracked vehicle.

The biggest problem with tracked vehicles of known type is that because of the fixed arrangement of all the bearing wheels the vehicle itself cannot be adapted to the different characteristics of the terrain such as for example snow.

Indeed, in soft snow the danger of sinking is increased and greater buoyancy of the vehicle would be necessary than in hard snow.

Furthermore, when changing speed in curves, less bearing on the inside track would be desirable so as to improve significantly steering properties. In other cases it is desirable that the bearing wheels on one side of the self-bearing chassis be on a different level than the bearing wheels on the other side of the bearing chassis so as to better travel over slopes, even transversely.

One object of the present invention is therefore to improve running of motor vehicles on snow, eliminating the abovementioned shortcomings, and propose a tracked vehicle whose tracks rest on the terrain, in particular on snow, and is adjustable to requirements, even with the tracks independent of each other.

Said object is achieved in accordance with the invention by the embodiment of a tracked vehicle and in particular one for the preparation of ski slopes comprising a self-bearing chassis, a plurality of bearing wheels fixed in a rotating manner on a horizontal axle at each longitudinal side of the chassis, a drive wheel fixed in a rotating manner on a horizontal axle at one of the ends of each longitudinal side of the chassis upstream of the first bearing wheel, a track tightening wheel fixed in a rotating manner to a horizontal axle at the other end of the longitudinal side downstream of the last bearing wheel and characterized in that at least said first bearing wheel or said last bearing wheel is supported by the chassis in a manner movable in the vertical plane containing it, there being provided drive means for moving each of said wheels from a lowered position in which part of the track running thereon is in contact with the underlying terrain to a position in which part of the track is raised from the terrain.

In a first preferred form of embodiment of the invention the two front bearing wheels and the two rear bearing wheels of each longitudinal side of the chassis are movable.

In a second preferred form of embodiment of the invention all the bearing wheels on each longitudinal side of the chassis are movable.

In this manner it is possible to move at least the first bearing wheel or the last bearing wheel seen in the direction of travel and preferably all the bearing wheels in such a manner as to allow a variation of the supporting surface of the track or of each of the tracks, independently of each other, on the terrain. It is clear that variation of the supporting surface of the terrain is equivalent to lengthening or shortening the lower leg of the track, which runs on the terrain. Shortening of the lower leg or operating both the tracks is desirable for example when the snow is hard along a straight track. In this manner contact friction is reduced with consequent reduction of energy consumption for movement of the tracked vehicle. On curves it is better to reduce the length of contact with the terrain of only one of the tracks so as to facilitate the manoeuvre as much as possible.

Further variants and configurations are described in the claims set forth below.

The details and characteristics of the tracked vehicle in accordance with the invention are made clear in the following description of its preferred forms of embodiment with reference to the annexed drawings wherein—

FIG. 1 shows a partially cut-away schematic perspective view of a self-bearing chassis with the respective tracks of known type omitted, FIGS. 2 and 3 show respectively in raised and lowered position a schematic side view of a track tightener in a second form of embodiment, the associated track being shown in phantom by broken line, and FIG. 4 shows a schematic plan view of the track tightener shown in FIGS. 2 and 3.

As shown in FIG. 1, in a known manner a self-bearing chassis 1 is provided at each longitudinal side with respective track tightening wheels 2, 3, bearing wheels from 4 to 8 at one side of the chassis, bearing wheels from 9 to 13 at the opposite side, and respective drive wheels 14, 15. The drive wheels 14, 15 are rotated, independently of each other in a manner known and not shown, by the drive means of said tracked vehicle in such a manner that forward travel is in compliance with the arrow 16.

In accordance with the invention a cross member 17 of the chassis 1, leading in the direction of the arrow 16, is crossed at each of its ends by a carriage indicated generally by reference number 18. From the cross-piece 17, extending at each longitudinal side of the chassis 1, there is an arm 19, 20 of the carriage 18. At the free end of each arm 19, 20 there is fixed a support 21, 22 with horizontal axle and rotatably bearing the track tightening wheels 2, 3 in a vertical plane laterally spaced from the vertical plane common to the bearing wheels from 4 to 8 and from 9 to 13, respectively. The distance between the vertical plane containing the bearing wheels and the vertical plane containing the track tightening wheel is determined in such a manner that the endless closed loop belt or truck can run on the bearing wheels without interfering with the adjustment of the track tightening wheels. Each arm 19, 20 is integral with a shoe 23 accommodated in a sliding manner in a longitudinal guide of the chassis 1. A cylinder and piston assembly 24 is connected through its stem with the shoe 23 and with the base of its cylinder at 25 with the chassis 1. Pivotally connected to the shoe 23 as at 27 on each longitudinal side of the chassis is a two-armed lever 26, supporting on one end thereof in a rotating manner the bearing wheels 4 and 9, respectively, while having its other end articulated as at 28 to the stem of a cylinder and piston unit 29 whose cylinder is articulated at 30 to the chassis 1. The length of each arm of each lever 26 supporting each of the bearing wheels 4 and 9 is sized in such a manner that each bearing wheel 4 and 9 is actually bearing in its lowered position against the associated belt or track (not shown in FIG. 1), while it acts merely as an idling and running wheel for the endless belt when it is rotated around the articulation point 27 by the effect of the cylinder and piston unit 29. It thus tilts or raises the forward end portion of the track above the supporting terrain. Each cylinder and piston unit, e.g. hydraulically controlled, is connected with a pressurized central control unit of the vehicle in such a manner that each one is adjustable independently of the other.

Similarly as for the bearing wheels 4, 9, the bearing wheel 8, 13 is in the vertical plane containing the other bearing wheels from 4 to 7 and from 9 to 12, respectively. In this case also this vertical plane is spaced from the vertical plane containing the drive wheel 14 and 15. Thus each drive wheel can move each track by merely meshing with the lugs of the belts, each of which, of course, is wide enough to overlie the associated drive wheel 14 or 15, the registering tightening wheels 2 or 3, as well as the associated series of bearing wheels 4 to 8 or 9 to 13. In this case also a two-armed lever 31 articulated at each longitudinal side of the chassis 1 bears in a rotating manner at the end of one of the arms at 32 associated with the bearing wheel 8 and 13 while it has its other arm articulated at 33 to the stem of a cylinder and piston unit 34 whose other arm is articulated at 35 to each longitudinal side of the chassis 1.

The axles of the bearing or running wheels 4 and 9 are laterally spaced from the track tightening wheels 2, 3 in such a manner that the wheels 4, 9 are between the centre of the wheels 2, 3 and their tangent. The same is true of the bearing and running wheels 8, 13 in relation to the drive wheels 14,15. That is to say, while the running wheels 4 and 9 are laterally spaced from the track tightening wheels 2 and 3, respectively, they also are disposed in overlapping, registering relation to their respective tightening wheels. The same is true of the running wheels 8 and 13, which, in addition to being laterally spaced from their adjacent drive wheels 14 and 15, respectively, they also are disposed in overlapping, registering relation with these wheels.

FIGS. 2 to 4 show another variant wherein the track tightening wheels 2, 3 are no longer borne in an adjustable running manner along the longitudinal axis of the self-bearing chassis 1. In this case from one end of the self-bearing chassis 36 there projects at each longitudinal side thereof a flange 37 integral with the chassis. To each flange 37 there is articulated in a rotating manner as at 38 one end of an arm 39 of a two-armed lever 40 whose second arm 41 bears at its free end in a rotating manner as at 42 a track tightening wheel 43. At the vertex 44 of the two-armed lever 40 there is pivoted the free end of a stem 45 of a hydraulic cylinder and piston unit 46 whose cylinder is supported by the chassis 36 in a swinging manner perpendicular to the articulation axles 38, 44 and 42.

Each flange 37 is also in a plane parallel to the plane containing running wheels 47 of which only one is shown in FIGS. 2-4. Also, in this form of embodiment, the distance between said two parallel planes is determined in such a manner that the laterally spaced wheels 43 and 47 as shown in FIGS. 2 and 3 can be disposed at least partially overlapped, in registering relation with each other. The wheel 47 is articulated to the chassis 36 and is operated by a hydraulic cylinder and piston unit as described for the first form of embodiment and therefore, for the sake of simplicity, the description thereof is not repeated.

The operation of this second form of embodiment is similar to that described for the first. As may be seen in FIGS. 2 and 3, by means of the cylinder and piston unit 46 and the cylinder and piston unit of the running wheel 47 the two wheels 43 and 47 can be taken for example from a reciprocal position as in FIG. 2, wherein the free part of the track 48 between the two wheels is not in contact with the terrain, into a reciprocal position wherein the free part is in contact with the terrain.

Various improvements and variants can be made to the object in accordance with the invention without exceeding its scope of protection as follows.

A hydraulic system with pressurized central elastic accumulation can provide uniform tension of the tracks automatically.

Hydraulic height regulation could be provided among all the bearing wheels to obtain adjustment of the supporting surface of each track on the terrain depending on the condition thereof.

Among the many advantages of the tracked vehicle in accordance with the invention are the following.

As compared with the known art, by moving the bearing wheels 8, 13 toward the centre of the drive wheels 14, 15 and the bearing wheels 4, 9 toward the centre of the track tightening wheels 2, 3 the lever effect of the tracked vehicle is reduced and decreases the danger of overturning, for example on steep ascents or descents.

The load can be distributed better on several wheels. The supporting surface of the tracks can be reduced for hard snow while it can be increased for soft snow and thus increase buoyancy.

We claim:

1. A tracked vehicle supported at each side thereof on an endless track for travel across a terrain, and suited in particular for the preparation of ski slopes, said vehicle comprising a self-bearing chassis having spaced, longitudinal sides, a plurality of track bearing wheels fixed to rotate in a vertical plane on longitudinally spaced horizontal axles at each longitudinal side of the chassis, a track drive wheel fixed in a rotating manner on a horizontal axle adjacent a first end of each longitudinal side of the chassis, a track tightening wheel fixed to a horizontal axle adjacent a second end opposite said first end of each longitudinal side of the chassis characterized in that at least one of said bearing wheels on each longitudinal side of said chassis is supported by said chassis in a manner to be movable in the vertical plane containing each said at least one bearing wheel, and drive means provided for moving each of said at least one bearing wheel from a lowered position, in which a lower leg of said track supported thereon is in contact with the underlying terrain during the travel of the vehicle across said terrain, to a raised position above said lowered position, said plurality of bearing wheels at each side of said chassis lying in a vertical plane spaced parallel to a plane containing the associated track tightening wheel, a first and second of each of said plurality of bearing wheels at each side of said chassis being disposed in overlapping, registering relation to a respective track drive and tightening wheel at each end of said chassis.

2. A tracked vehicle in accordance with claim 1 characterized in that said drive means includes means for mounting all the bearing wheels on each side of the chassis for movement between said raised and lowered positions.

3. Tracked vehicle in accordance with claim 1, characterized in that said bearing wheels are supported by the chassis in a movable manner and are arranged in a rotating manner each at the end of one of the arms of a two-armed lever supported in a rotating manner on one of the longitudinal sides of the chassis and to whose other arm is articulated the stem of a cylinder and piston unit whose cylinder is fixed to said longitudinal side of the chassis, a pressurized central control unit being connected with the cylinder and piston unit.

4. Tracked vehicle in accordance with claim 1, characterized in that each track tightening wheel is fixed in a rotating manner to a longitudinal extension of a shoe sliding longitudinally in a guide of the chassis and said shoe being controlled by a pressurized central cylinder and piston unit and there being articulated to said shoe said two-armed lever controlled by the pressurized cylinder and piston unit.

5. Tracked vehicle in accordance with claim 1 characterized in that each track tightening wheel is born in a rotating manner by one end of one of the arms of a double lever articulated in a rotating manner at its vertex to a flange projecting from one of the ends of the chassis and pivoted with the free end of its other arm to the stem of a hydraulic cylinder and piston unit the cylinder of which is fixed in a rotating manner to the chassis.

6. A tracked vehicle in accordance with claim 1, characterized in that said track drive wheels, which are located adjacent each longitudinal side of said chassis, lie in the same vertical planes containing said track tightening wheels.

* * * * *